(12) United States Patent
Giffen

(10) Patent No.: US 11,231,972 B1
(45) Date of Patent: Jan. 25, 2022

(54) DIALOG-STYLE APPLICATION PROGRAMMING INTERFACE FOR A MACHINE LEARNING SOLUTION

(71) Applicant: INTERNATIONAL BUSINESS MACHINES CORPORATION, Armonk, NY (US)

(72) Inventor: Perry Randolph Giffen, Kemptville (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/247,188

(22) Filed: Dec. 3, 2020

(51) Int. Cl.
  G06F 9/54     (2006.01)
  G06N 20/00    (2019.01)
  G06F 8/60     (2018.01)
  G06F 11/36    (2006.01)
  G06F 8/30     (2018.01)

(52) U.S. Cl.
  CPC ............... *G06F 9/541* (2013.01); *G06F 8/30* (2013.01); *G06F 8/60* (2013.01); *G06F 11/3668* (2013.01); *G06N 20/00* (2019.01)

(58) Field of Classification Search
  None
  See application file for complete search history.

(56) References Cited

U.S. PATENT DOCUMENTS

| 8,533,746 | B2 | 9/2013 | Nolan |
| 8,843,941 | B2 | 9/2014 | Moore |
| 9,736,222 | B1 * | 8/2017 | Dahan .................. G06F 21/629 |
| 9,916,420 | B2 | 3/2018 | Cardoza |
| 2013/0174126 | A1 * | 7/2013 | Belihomji ........... G06F 11/3668 717/127 |
| 2016/0182316 | A1 * | 6/2016 | Katieb .................. G06Q 10/10 709/221 |
| 2017/0206319 | A1 | 7/2017 | Attanapola et al. |
| 2019/0286646 | A1 * | 9/2019 | Kraytem ............... G06F 16/215 |
| 2019/0347121 | A1 * | 11/2019 | Luo ....................... G06F 3/0644 |

(Continued)

OTHER PUBLICATIONS

McDonald, Carol; How Big Data is Reducing Costs and Improving Outcomes in Health Care; https://mapr.com/blog/reduce-costs-and-improve-health-care-with-big-data/; retrieved from the Internet Oct. 15, 2019; 20 pages.

(Continued)

*Primary Examiner* — Chat C Do
*Assistant Examiner* — William C Wood
(74) *Attorney, Agent, or Firm* — Schmeiser, Olsen & Watts; Aaron Pontikos

(57) ABSTRACT

An approach is provided for using a dialog-style API for a machine learning solution. A server receives from a client a first call to a dialog-style application programming interface (API) as a first request having an incomplete set of data items. The API determines that one or more data items required by the first request are missing from the incomplete set of data items. First metadata that describes the one or more missing data items are sent to the client. The server receives from the client a second call to the API as a second request having a complete set of data items which includes the one or more data items. The server sends to the client a reply having values of data items in a response to the second request and second metadata that describes the data items in the response.

17 Claims, 9 Drawing Sheets

(56) References Cited

U.S. PATENT DOCUMENTS

2019/0362197 A1* 11/2019 Jain .................... G06N 3/0481
2020/0065160 A1* 2/2020 Park .................... G06N 20/00

OTHER PUBLICATIONS

Using the Automatic API Updater; https://docs.unity3d.com/Manual/APIUpdater.html; retrieved from the Internet Oct. 17, 2019; 5 pages.

Mell, Peter et al.; "The NIST Definition of Cloud Computing;" National Institute of Standards and Technology; Special Publication 800-145; Sep. 2011; 7 pages.

\* cited by examiner

DIALOG-STYLE APPLICATION PROGRAMMING INTERFACE FOR A MACHINE LEARNING SOLUTION

BACKGROUND

The present invention relates to a machine learning solution, and more particularly to providing a dialog-style application programming interface (API) for a machine learning solution.

Existing machine learning solutions provide valuable insight into healthcare situations. Using key features from similar historical situations, an existing machine learning solution is trained to provide assessments and make recommendations. The assessments and recommendations support the decision-making of patients, caregivers, clinicians, and administrators. Guideline-based rules may be included to provide additional value in the machine learning solution.

An existing machine learning solution may provide an API that accepts the feature values that are appropriate for a situation and respond with an assessment, recommendation, and explanation. This style of API is familiar to developers of existing machine learning solutions and developers of clients that call the existing machine learning solutions.

SUMMARY

In one embodiment, the present invention provides a computer-implemented method. The method includes receiving, by one or more processors of a server computer and from a client computer, a first call to an application programming interface (API) in a machine learning solution as a first request having an incomplete set of data items. The method further includes in response to the receiving the first call to the API, determining, by the one or more processors, that one or more data items are required by the first request and are missing from the incomplete set of data items. The method further includes in response to the determining that the one or more data items are required by the first request and are missing from the incomplete set of data items, sending, by the one or more processors and to the client computer, first metadata that describes the one or more data items that are missing from the incomplete set of data items. The method further includes receiving, by the one or more processors and from the client computer, a second call to the API as a second request having a complete set of data items. The complete set of data items includes the one or more data items. The method further includes in response to the receiving the second call to the API, sending, by the one or more processors and to the client computer, a reply having values of data items in a response to the second request and second metadata that describes the data items in the response.

A computer program product and a computer system corresponding to the above-summarized method are also described and claimed herein.

DETAILED DESCRIPTION

Overview

Figure 1:
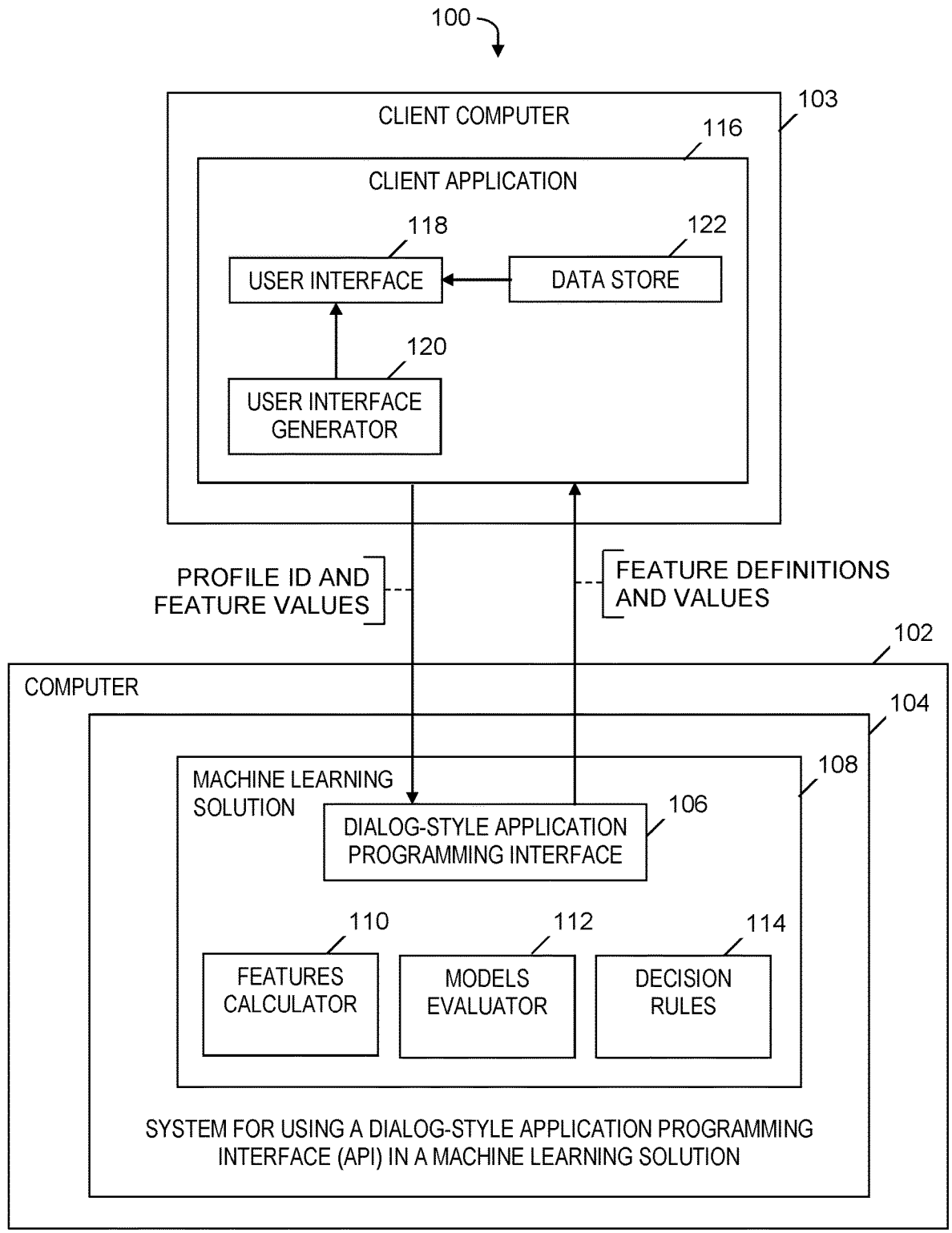
FIG. 1 is a block diagram of a system for using a dialog-style API in a machine learning solution, in accordance with embodiments of the present invention.

Existing machine learning solutions in known applications make recommendations (e.g., recommendations about a priority of tasks) based on predictive analytics. Although a traditional API can be used to develop the aforementioned applications, actual development of such applications has revealed that the traditional API is a bottleneck for solution development and solution evolution. Further, a traditional programmatic API is based mainly on the needs of an information technology platform and is essentially a function call which provides an approach for developing interactive software components. The traditional programmatic API, however, is a poor fit for machine learning solutions in a domain such as healthcare, in which the knowledge base is vast, specialized, and frequently changes. Therefore, an API has not been implemented for many situations that would benefit from solutions using machine learning and guidelines. Still further, the effectiveness of a known machine learning solution is partly based on the solution being supplied with relevant features for training and operation. Known machine learning solutions that use a fixed feature set lack flexibility to address features evolving over time as the problem changes or is better understood. Other known machine learning solutions that provide traditional customized solutions to address features evolving over time are resource intensive because such customized solutions require customized coding by a programmer.

Traditionally, a healthcare domain expert and data scientist identify the features needed for an API used in a known machine learning solution and a programmer develops the known API that implements the identified features. When the known API needs to be updated in the known machine learning solution (e.g., an update required in response to new features being identified), the programmer is again involved to generate customized coding to implement the update to the features. This traditional process of addressing API development and updates limits the scalability and adaptability of healthcare machine learning solutions. The drawbacks of the implementation of known APIs include requiring programming changes in both the server and the client in response to a change in the features, which is costly in terms of resources and which can slow down the evolution of the API.

Embodiments of the present invention address the aforementioned unique challenges of the traditional APIs for traditional machine learning solutions by providing a new dialog-style API for machine learning solutions, including but not limited to machine learning solutions for healthcare. In a case in which the new dialog-style API for a machine learning solution is called with all of the required features, a response is returned with values that include the same information (e.g., an assessment, a recommendation, and an explanation) as the traditional API, thereby ensuring backward compatibility is preserved. These response values are considered to be features and may include a feature description so they can be presented in a generated user interface or assigned to a data store. In the case in which the new dialog-style API for the machine learning solution is called without all of the required features (i.e. additional features are required), then the returned data in the response includes a description of the additional required features. This description includes enough detailed information to (1) generate a user interface and collect the values of the additional required features from the generated user interface or (2) obtain the values of the additional required features from a data store. Rather than requiring all required features to be passed at once, the new dialog-style API gradually builds up the set of required features through iterations of requests sent to and responses sent from the API. In one embodiment, the API processes the request when the required features are included in the request, but if any additional features are required, the API responds with a definition of the required details, thereby allowing the API to evolve to meet the needs of the domain experts and the underlying machine learning system and decision management system without the need for reprogramming. In one embodiment, the dialog-style API provides an adaptable interaction that is built upon principles of a dialog between experts and clients.

In one embodiment, the novel API design described herein is applied to healthcare situations because the API design mirrors the dialog between a clinician and a consultant. When the clinician contacts a consultant about a particular healthcare situation, the consultant typically requests a set of features. If the clinician is very familiar with the situation, the clinician provides the set of features without prompting. If a new feature is needed, then a prompting of the clinician is required, even if the clinician is experienced.

System for Using a Dialog-Style API in a Machine Learning Solution

FIG. 1 is a block diagram of a system 100 for using a dialog-style API in a machine learning solution, in accordance with embodiments of the present invention. System 100 includes a computer 102 in communication with a client computer 103 via a computer network (not shown). Computer 102 is a server computer that executes a software-based system 104 for using a dialog-style API 106 in a machine learning solution 108 (also referred to herein as a machine learning system). Hereinafter, the aforementioned system 104 for using a dialog-style API 106 in a machine learning solution 108 is referred to simply as "dialog-style API system 104." Machine learning solution 108 includes a features calculator 110, a models evaluator 112, and decision rules 114.

Client computer 103 executes a software-based application 116, which includes a user interface 118, a user interface generator 120, and a data store 122. User generator 120 generates user interface 118. Data store 122 stores values of features. Client application 116 calls dialog-style API 106 by sending a request to dialog-style API system 104, where the request includes a profile identifier (ID) (i.e., an identifier of a set of features) and values of features in the set of features. In response to receiving the set of features that are required for the request, dialog-style API 106 returns a response to the request that includes values of the features and metadata that describes definitions of the features (e.g., names of features and types of features).

In one embodiment, a domain expert (e.g., a physician) provides the definition of features. In one embodiment, because dialog-style API 106 returns the definition of any missing features, client application 116 uses user interface generator 120 to generate user interface 118 to obtain the value of a missing feature or retrieves the value of the missing feature from data store 122. One or more embodiments of the present invention allow domain experts and other non-programmers to define, update, and manage the new dialog-style API 106 for a machine learning system (i.e., machine learning solution 108) without requiring customized coding by programmers, thereby allowing the dialog-style API 106 to easily evolve to include additional situations (i.e., profiles) and to modify the features used for current situations. Thus, the machine learning system provides a solution that has greater situational intelligence and is less resource intensive than the traditional approaches.

The profiles of the dialog-style API 106 using a structured document. In one embodiment, machine learning solution 108 using the dialog-style API 106 provides a text editor (not shown) (e.g., a text editor of a custom API definition editor) or a dedicated structural editor (not shown) by which a domain expert can define or edit a profile. A profile definition includes definitions of a set of features in the profile. Most domain experts are already familiar with editing structured documents by using a tool that assists in creating valid content (e.g., word processor). By authoring a document with more structure, the domain expert is able to define profiles for the dialog-style API 106.

In one embodiment, a dialog-style API 106 in machine learning solution 108 for a domain such as healthcare provides an ability to evaluate an analytic profile for a particular situation. The situation is commonly related to a specific entity, such as a patient or test result in the healthcare domain. The analytic profile includes a set of features that describe the situation. These features are the input to machine learning solution 108. Using the features that are input, models evaluator 112 evaluates existing machine learning models and decision rules 114 (i.e., rule-based guidelines). In one embodiment, dialog-style API system 104 stores the features in a data repository (not shown). Dialog-style API system 104 can later retrieve the features from the data repository and use the features for training of machine learning models.

In one embodiment, each profile definition includes feature definitions. In one embodiment, each of the feature definitions includes the following attributes:

Feature ID: a unique identifier input for each feature in a profile.

Analytic type of the feature: The analytic type determines the data type of the feature and the user interface controls used to edit and display the value of the feature. The data type may be a primitive type or a complex type. Examples of primitive analytic types include Boolean, choice, text, and number.

Label: describes a feature in a user interface.

Additional information: any additional information required for the analytic type, such as a list of value choices or the units for a number.

Flag: indicates whether a feature is read-only. In one embodiment, the flag is used for features in the response.

In other embodiments, feature definitions include the attributes listed above and one or more of the following attributes:

Help details: a reference to help that describes a feature.

External system: External system feature accessor that is used to acquire a feature value from the calling system (i.e., client application 116).

Message: message with additional details about the requirements for a valid value of a feature.

Default value: default value of a feature.

In one embodiment, a novel approach to providing and using dialog-style API 106 for machine learning solution 108 improves upon known technologies that use a specification to define traditional API features and generate a user interface based on the definition in the specification. The improvement upon the known technologies includes using the aforementioned novel solutions as part of an API design that allows the dialog-style API 106 to evolve independent of the client application 116 and to allow additional features to be requested when calling dialog-style API 106 for machine learning solution 108. Embodiments of the present invention separate the definition and evolution of an analytic service API from the technology platform that supports it, thereby allowing domain experts to provide new service APIs and evolve APIs that are already implemented without the need for custom programming. Further, embodiments of the present invention allow domain clients to immediately take advantage of the new dialog-style API 106 without the need for custom programming of the client application 116.

In one embodiment, the functionality provided by the dialog-style API 106 is a superset of a traditional programmatic API. Thus, a traditional client application with a custom coded user interface can use the dialog-style API 106, thereby providing flexibility for a client application to gradually adopt the capability of the dialog-style API 106.

The functionality of the components shown in FIG. 1 is described in more detail in the discussion of FIG. 2, FIG. 3, FIG. 4, FIG. 5, FIG. 6, and FIG. 7 presented below.

Process for Developing a Dialog-Style API in a Machine Learning Solution

Figure 2:
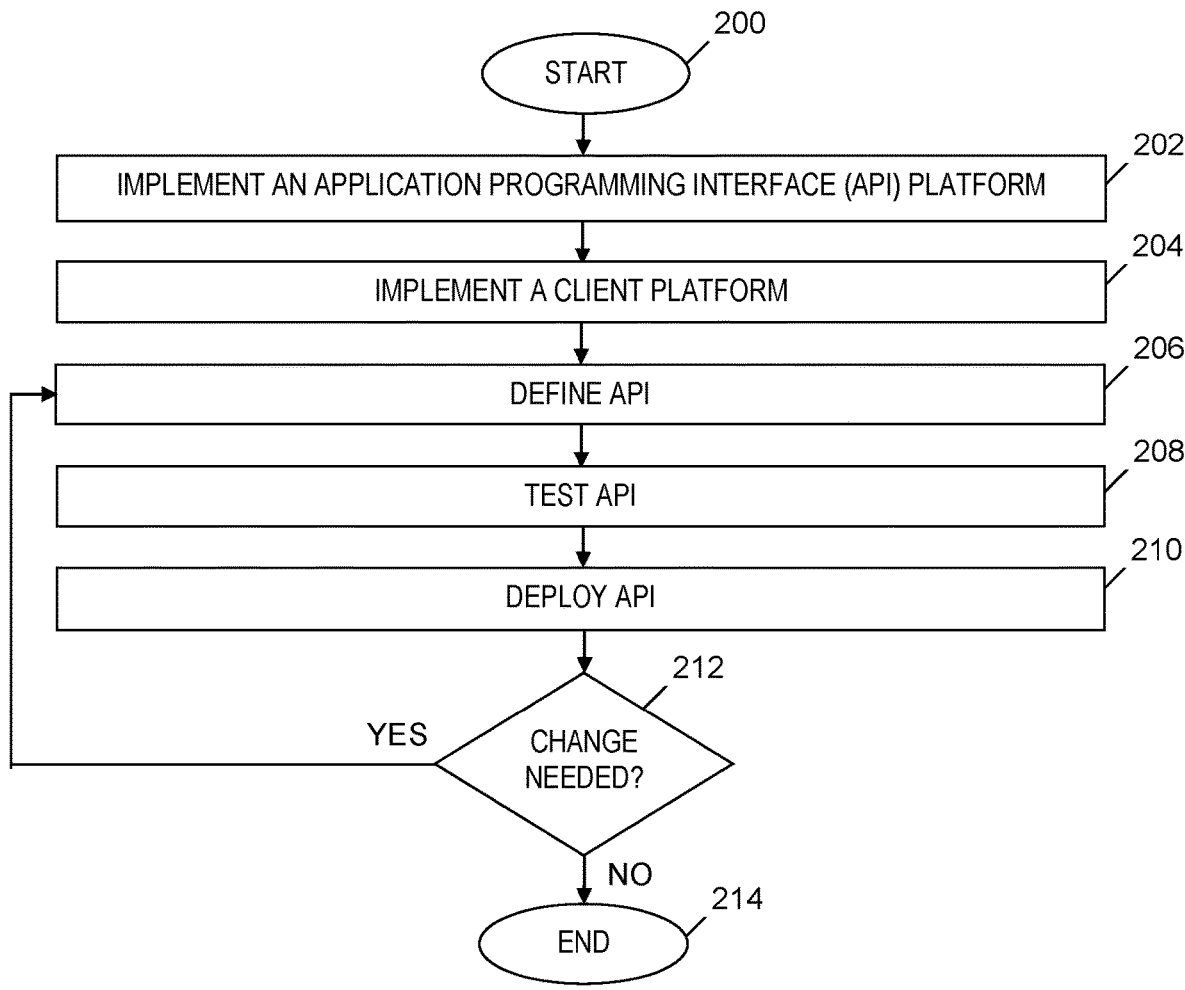
FIG. 2 is a flowchart of a process of developing a dialog-style API, where the process is implemented in the system of FIG. 1, in accordance with embodiments of the present invention.

FIG. 2 is a flowchart of a process of developing a dialog-style API, where the process is implemented in the system of FIG. 1, in accordance with embodiments of the present invention. The process of FIG. 2 begins at a start node 200. In step 202, a programmer using an API platform implementation tool implements an API platform for dialog-style API 106 (see FIG. 1). In one embodiment, step 202 includes the programmer using aforementioned tool to develop code for the API platform, test the API platform, and deploy the API platform.

In step 204, a programmer using a client platform implementation tool implements a client platform for client application 116 (see FIG. 1). In one embodiment, step 204 includes a programmer using the client platform implementation tool to develop code for the client platform, test the client platform, and deploy the client platform.

In step 206, dialog-style API system 104 (see FIG. 1) for using a dialog-style API in a machine learning solution defines dialog-style API 106 (see FIG. 1).

In step 208, dialog-style API system 104 (see FIG. 1) tests dialog-style API 106 (see FIG. 1).

In step 210, dialog-style API system 104 (see FIG. 1) deploys dialog-style API 106 (see FIG. 1).

In step 212, dialog-style API system 104 (see FIG. 1) determines whether dialog-style API 106 (see FIG. 1) requires a change based on a current context of a situation being evaluated by machine learning solution 108. If dialog-style API 106 (see FIG. 1) needs to be changed as determined in step 212, then the Yes branch of step 212 is followed and the process loops back to steps 206, 208 and 210 to re-define the dialog-style API 106 (see FIG. 1) in accordance with the change, and subsequently re-test and re-deploy the re-defined dialog-style API 106 (see FIG. 1).

Returning to step 212, if dialog-style API system 104 (see FIG. 1) determines that dialog-style API 106 (see FIG. 1) does not require a change, then the No branch of step 212 is followed and the process of FIG. 2 ends at an end node 214.

Process for Using a Dialog-Style API in a Machine Learning Solution

Figure 3:
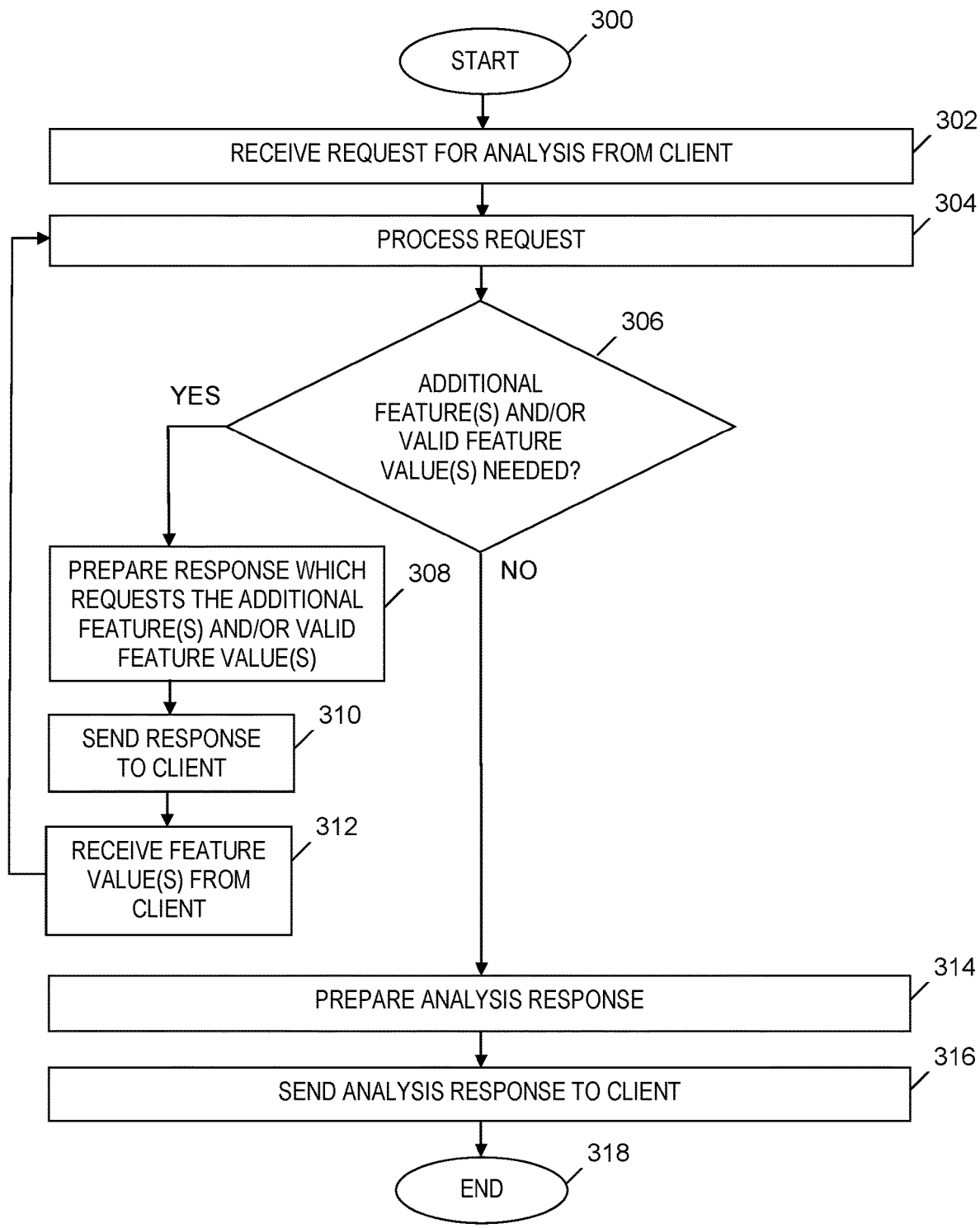
FIG. 3 is a flowchart of a process of implementing a dialog-style API, where the process is implemented in the system of FIG. 1, in accordance with embodiments of the present invention.

FIG. 3 is a flowchart of a process of implementing a dialog-style API, where the process is implemented in the system of FIG. 1, in accordance with embodiments of the present invention. After the dialog-style API 106 (see FIG. 1) is defined in the process of FIG. 2, the process of FIG. 3 implements the dialog-style API 106 (see FIG. 1). The process of FIG. 3 begins at a start node 300.

Prior to step 302, client application 116 (see FIG. 1) sends to dialog-style API system 104 (see FIG. 1) a request for analysis to be performed by machine learning solution 108. The request for analysis is sent via client application 116 (see FIG. 1) sending a call to dialog-style API 106 (see FIG. 1). In step 302, dialog-style API system 104 (see FIG. 1) receives the request for analysis from client application 116 (see FIG. 1).

In step 304, dialog-style API system 104 (see FIG. 1) processes the request. Processing the request in step 304 includes processing of a profile. In one embodiment, the processing of the profile includes evaluation using (i) machine learning models by models evaluator 112 (see FIG. 1) and (ii) decision rules 114 (see FIG. 1). In one embodiment, the processing in step 304 results in an assessment, a recommendation, and an explanation. Dialog-style API system 104 performs unit and regression tests of the processing in step 304 to ensure that the processing returns the expected results.

In step 306, dialog-style API system 104 (see FIG. 1) determines whether additional feature(s) and/or valid feature value(s) are needed from client application 116 (see FIG. 1) to complete the processing of the request processed in step 304. If dialog-style API system 104 (see FIG. 1) determines in step 306 that additional feature(s) and/or valid feature value(s) are needed, then the Yes branch of step 306 is followed and step 308 is performed. To determine that valid feature value(s) are needed, dialog-style API system 104 (see FIG. 1) determines that feature value(s) in the request are invalid.

In one embodiment, step 306 is performed in response to step 304. In another embodiment, step 306 is performed in response to step 302.

In step 308, dialog-style API system 104 (see FIG. 1) prepares a response to request from client application 116 (see FIG. 1) the aforementioned additional feature(s) and/or the valid feature value(s). In step 308, dialog-style API system 104 (see FIG. 1) adds definition(s) to the response so that value(s) of the additional feature(s) and/or the valid feature value(s) can be included in a subsequent request from client application 116 (see FIG. 1). The added definition(s) are respective definition(s) of the additional feature(s) that are needed and/or the feature(s) whose valid value(s) are needed.

In step 310, dialog-style API system 104 (see FIG. 1) sends the response prepared in step 308 to client application 116 (see FIG. 1). In one embodiment, steps 308 and 310 are performed in response to the Yes branch being followed from step 306.

After step 310 and prior to step 312, client application 116 (see FIG. 1) receives the response sent in step 310, prepares a request that supplies feature value(s) corresponding to the definition(s) added in step 308, and sends the request to dialog-style API system 104 (see FIG. 1) via a call to dialog-style API 106 (see FIG. 1). In one embodiment, to supply the feature value(s), user interface generator 120 (see FIG. 1) generates controls for user interface 118 (see FIG. 1) based on the definition(s) in the response sent in step 310, and the user interface 118 (see FIG. 1) collects the feature value(s) by using the controls. Alternatively, user interface 118 (see FIG. 1) obtains the feature value(s) from data store 122 (see FIG. 1). By collecting or obtaining the feature value(s) as described above, dialog-style API system 104 (see FIG. 1) allows client application 116 (see FIG. 1) to handle changes to dialog-style API 106 (see FIG. 1) without the need for reprogramming. It is also possible to use dialog-style API system 104 (see FIG. 1) together with a traditional client application (not shown) that is built according to a current profile description and requires reprogramming if the current profile description changes.

In step 312, dialog-style API system 104 (see FIG. 1) receives the feature value(s) from client application 116 (see FIG. 1) by receiving the request that had been sent after step 310 and prior to step 312.

Following step 312, the process of FIG. 3 loops back to step 304 to process the request that is received in step 312.

Returning to step 306, if dialog-style API system 104 (see FIG. 1) determines that no additional value(s) or valid feature value(s) are needed, then the profile processing completes successfully, the No branch of step 306 is followed, and step 314 is performed.

In step 314, dialog-style API system 104 (see FIG. 1) prepares an analysis response (i.e., the result features are added to the analysis response).

In step 316, dialog-style API system 104 (see FIG. 1) sends the analysis response to client application 116 (see FIG. 1). In one embodiment, steps 314 and 316 are performed in response to steps 312, 304, and the No branch followed from step 306.

Following step 316, the process of FIG. 3 ends at an end node 318.

Figure 4:
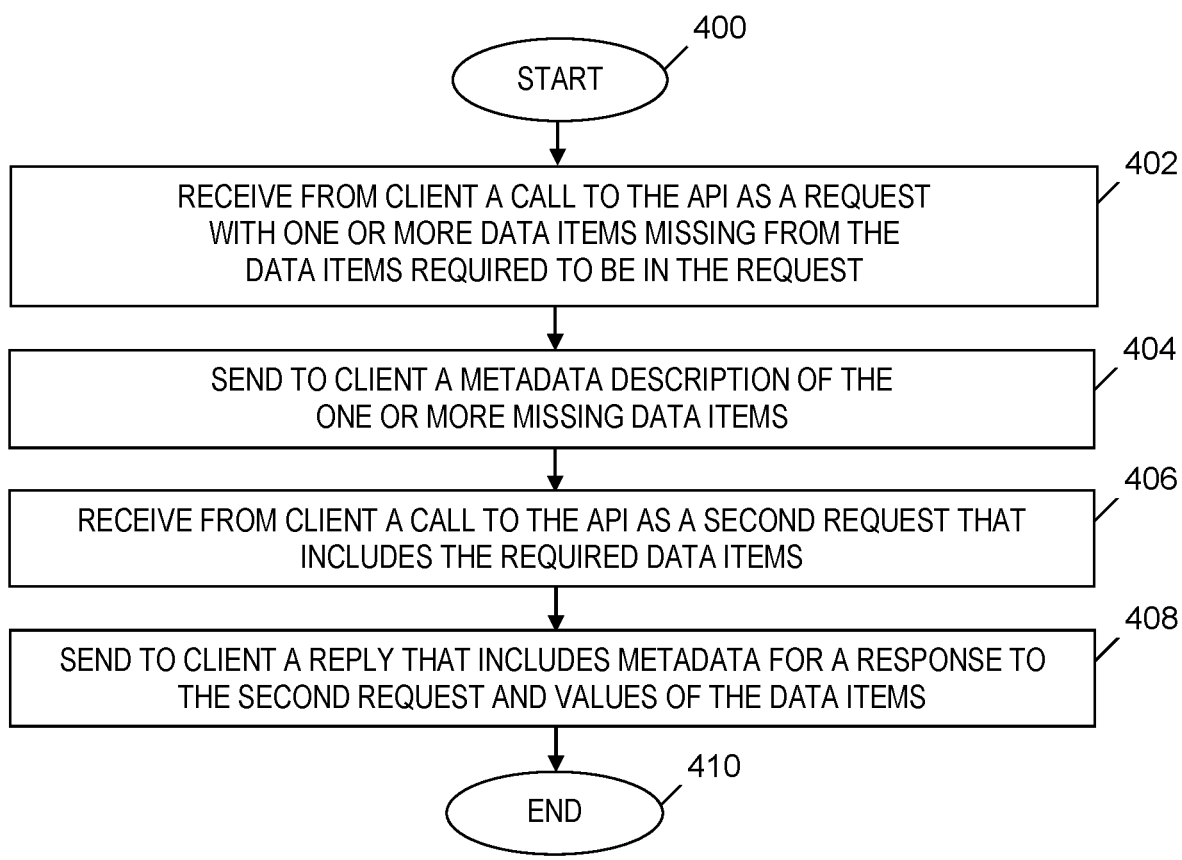
FIG. 4 is a flowchart of a process of using a dialog-style API in a first scenario, where the process is implemented in the system of FIG. 1, in accordance with embodiments of the present invention.

FIG. 4 is a flowchart of a process of using dialog-style API 106 (see FIG. 1) in a first scenario, where the process is implemented in the system of FIG. 1, in accordance with embodiments of the present invention. The process of FIG. 4 begins at a start node 400. Prior to step 402, client computer 103 (see FIG. 1) creates client application 116 (see FIG. 1) based on a description of dialog-style API 106 (see FIG. 1) that defines how the possible data items are defined. As used herein, a data item is synonymous with a feature. In step 402, dialog-style API system 104 (see FIG. 1) receives from client application 116 (see FIG. 1) a call to dialog-style API 106 (see FIG. 1) which is a first request for an analysis by machine learning solution 108 (see FIG. 1). In response to receiving the call, dialog-style API system 104 (see FIG. 1) determines the data items that are required by the first request and further determines that one or more data items that are required are missing from the first request.

In step 404, in response to determining that the one or more data items are required by the first request and are missing from the first request, dialog-style API system 104 (see FIG. 1) sends to client application 116 (see FIG. 1) a metadata description (e.g., names and types) of the one or more missing data items.

In step 406, dialog-style API system 104 (see FIG. 1) receives from client application 116 (see FIG. 1) a second call to dialog-style API 106 (see FIG. 1), which is a second request that includes all of the data items that were required by the first request.

In step 408, in response to receiving the second call in step 406, dialog-style API system 104 (see FIG. 1) sends to client application 116 (see FIG. 1) a reply that includes (1) metadata (e.g., names and types) that describe data items for a response to the second request and (2) values of the data items for the response. The client application 116 (see FIG. 1) receives the reply and uses the metadata and values in the reply to display and/or process the response.

Following step 408, the process of FIG. 4 ends at an end node 410.

Figure 5:
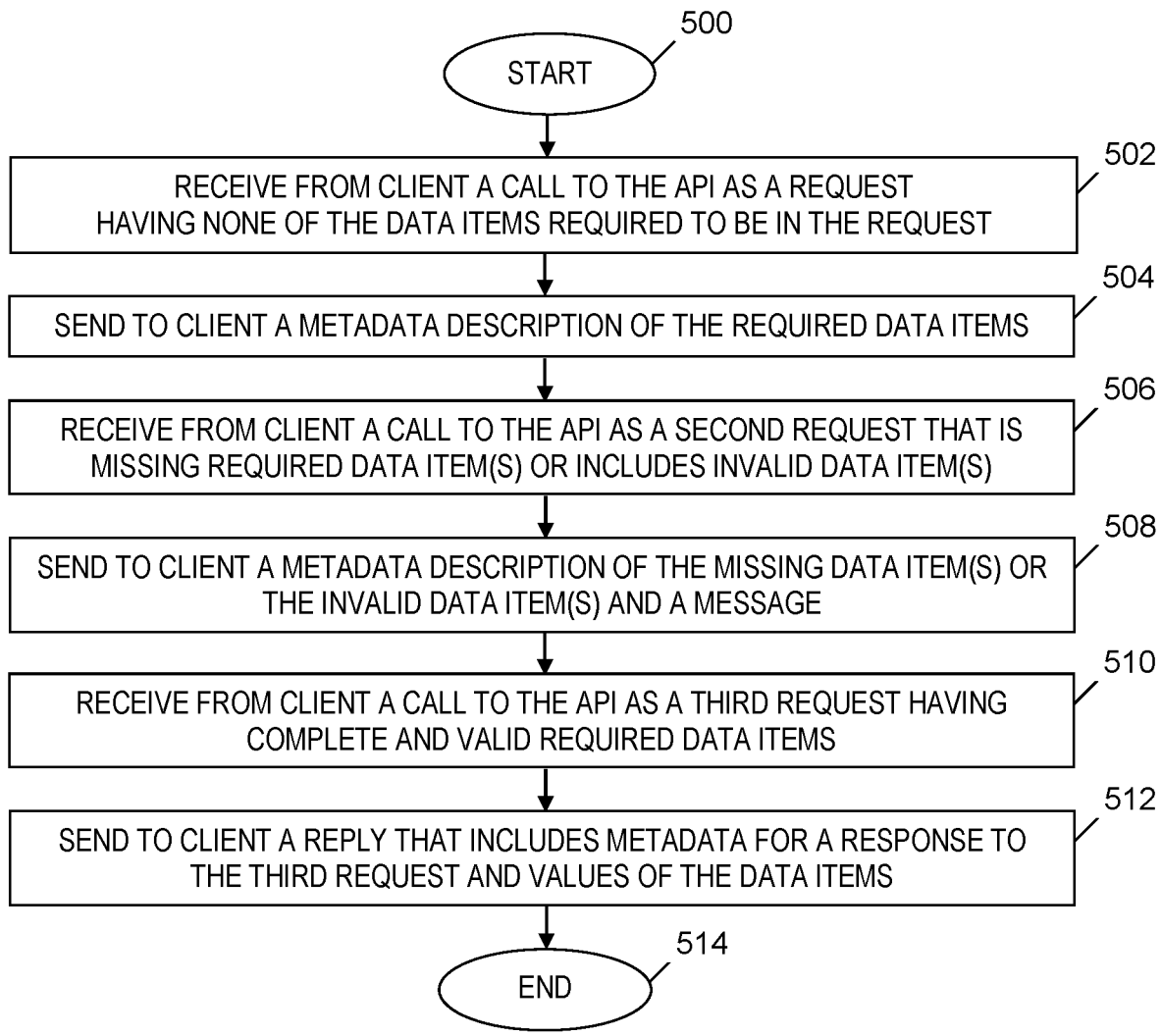
FIG. 5 is a flowchart of a process of using a dialog-style API in a second scenario, where the process is implemented in the system of FIG. 1, in accordance with embodiments of the present invention.

FIG. 5 is a flowchart of a process of using dialog-style API 106 (see FIG. 1) in a second scenario, where the process is implemented in the system of FIG. 1, in accordance with embodiments of the present invention. The process of FIG. 5 begins at a start node 500. Prior to step 502, client application 116 (see FIG. 1) is created as described in the discussion of FIG. 4. In step 502, dialog-style API system 104 (see FIG. 1) receives from client application 116 (see FIG. 1) a call to dialog-style API 106 (see FIG. 1) which is a first request for an analysis by machine learning solution 108 (see FIG. 1). In response to receiving the call, dialog-style API system 104 (see FIG. 1) determines a set of data items is required by the first request and further determines that the first request includes none of the data items in the required set of data items.

In step 504, in response to determining that the first request includes none of the required data items, dialog-style API system 104 (see FIG. 1) sends to client application 116 (see FIG. 1) a metadata description (e.g., names and types) of the data items in the required set of data items.

In step 506, dialog-style API system 104 (see FIG. 1) receives from client application 116 (see FIG. 1) a second call to dialog-style API 106 (see FIG. 1), which is a second request that is determined by dialog-style API system 104 (see FIG. 1) to be missing one or more of the required data items or includes one or more invalid data items.

In step 508, in response to receiving the second call in step 506, dialog-style API system 104 (see FIG. 1) sends to client application 116 (see FIG. 1) (1) a metadata description (e.g., names and types) of the data item(s) that were determined to be missing or invalid and (2) a message indicating the that data item(s) are missing or invalid.

In step 510, dialog-style API system 104 (see FIG. 1) receives from client application 116 (see FIG. 1) a third call to dialog-style API 106 (see FIG. 1), which is a third request that includes the complete required set data items, where all the data items in the third request are valid.

In step 512, in response to receiving the third call in step 510, dialog-style API system 104 (see FIG. 1) sends to client application 116 (see FIG. 1) a reply that includes (1) metadata (e.g., names and types) that describe data items for a response to the third request and (2) values of the data items for the response. The client application 116 (see FIG. 1) receives the reply and uses the metadata and values in the reply to display and/or process the response.

Following step 512, the process of FIG. 5 ends at an end node 514.

Figure 6:
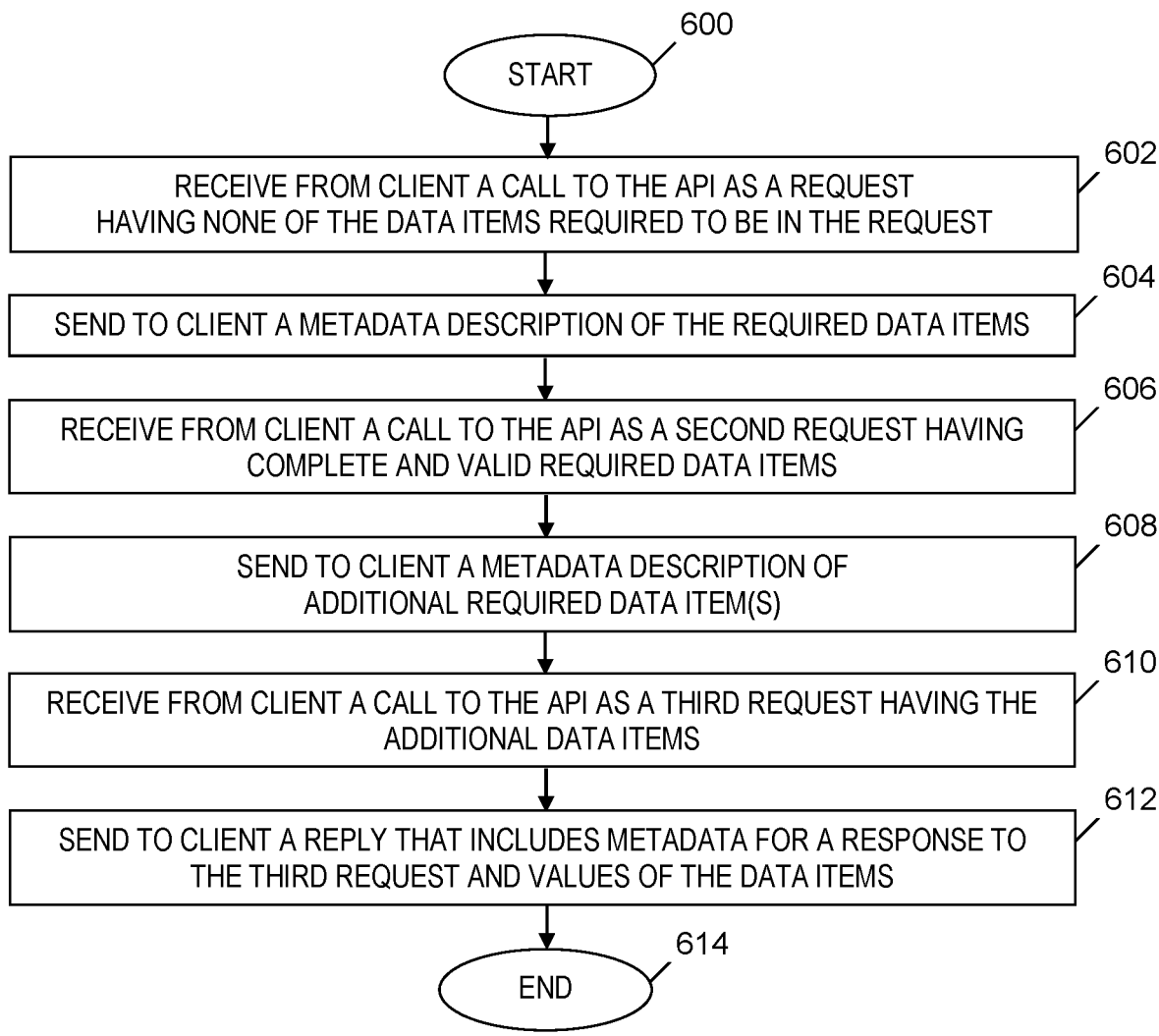
FIG. 6 is a flowchart of a process of using a dialog-style API in a third scenario, where the process is implemented in the system of FIG. 1, in accordance with embodiments of the present invention.

FIG. 6 is a flowchart of a process of using dialog-style API 106 (see FIG. 1) in a third scenario, where the process is implemented in the system of FIG. 1, in accordance with embodiments of the present invention. The process of FIG. 6 begins at a start node 600. Prior to step 602, client application 116 (see FIG. 1) is created as described in the discussion of FIG. 4. In step 602, dialog-style API system 104 (see FIG. 1) receives from client application 116 (see FIG. 1) a first call to dialog-style API 106 (see FIG. 1) which is a first request for an analysis by machine learning solution 108 (see FIG. 1). In response to receiving the first call, dialog-style API system 104 (see FIG. 1) determines a set of data items is required by the first request and further determines that the first request includes none of the data items in the required set of data items.

In step 604, in response to determining that the first request includes none of the required data items, dialog-style API system 104 (see FIG. 1) sends to client application 116 (see FIG. 1) a metadata description (e.g., names and types) of the data items in the required set of data items.

In step 606, dialog-style API system 104 (see FIG. 1) receives from client application 116 (see FIG. 1) a second call to dialog-style API 106 (see FIG. 1), which is a second request that is determined by dialog-style API system 104 (see FIG. 1) to have a complete set of required data items and the data items in the second request are valid.

In step 608, in response to receiving the second call in step 606, dialog-style API system 104 (see FIG. 1) sends to client application 116 (see FIG. 1) (1) a metadata description (e.g., names and types) of additional data item(s) that dialog-style API system 104 (see FIG. 1) determined were required by the second request.

In step 610, dialog-style API system 104 (see FIG. 1) receives from client application 116 (see FIG. 1) a third call to dialog-style API 106 (see FIG. 1), which is a third request that includes the additional data item(s).

In step 612, in response to receiving the third call in step 610, dialog-style API system 104 (see FIG. 1) sends to client application 116 (see FIG. 1) a reply that includes (1) metadata (e.g., names and types) that describe data items for a response to the third request and (2) values of the data items for the response. The client application 116 (see FIG. 1) receives the reply and uses the metadata and values in the reply to display and/or process the response.

Following step 612, the process of FIG. 6 ends at an end node 614.

Computer System

Figure 7:
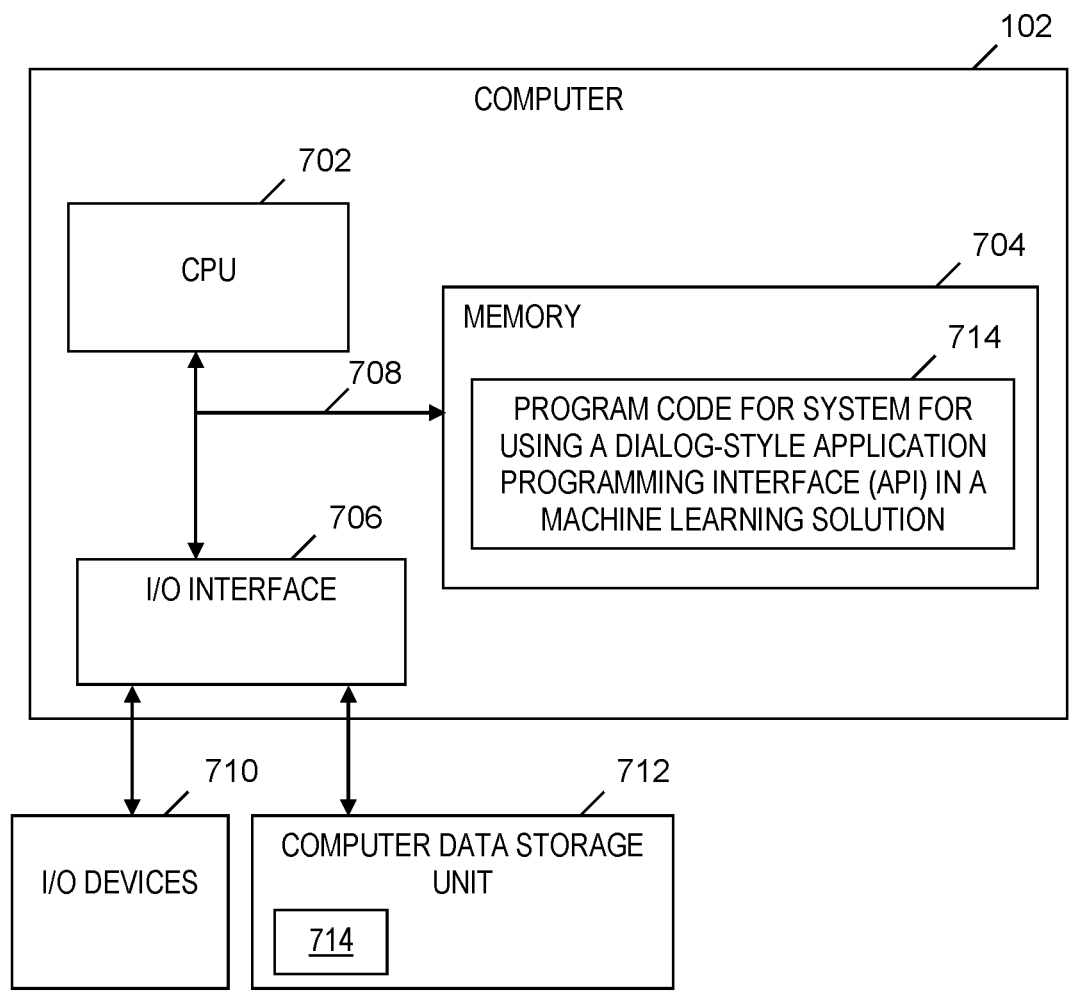
FIG. 7 is a block diagram of a computer that is included in the system of FIG. 1 and that implements the processes of FIG. 2, FIG. 3, FIG. 4, FIG. 5, and FIG. 6, in accordance with embodiments of the present invention.

FIG. 7 is a block diagram of a computer that is included in the system of FIG. 1 and that implements the processes of FIG. 2, FIG. 3, FIG. 4, FIG. 5, and FIG. 6, in accordance with embodiments of the present invention. Computer 102 is a computer system that generally includes a central processing unit (CPU) 702, a memory 704, an input/output (I/O) interface 706, and a bus 708. Further, computer 102 is coupled to I/O devices 710 and a computer data storage unit 712. CPU 702 performs computation and control functions of computer 102, including executing instructions included in program code 714 for a system dialog-style API system 104 (see FIG. 1) to perform a method of defining and using a dialog-style API in a machine learning solution, where the instructions are executed by CPU 702 via memory 704. CPU 702 may include a single processing unit or processor or be distributed across one or more processing units or one or more processors in one or more locations (e.g., on a client and server).

Memory 704 includes a known computer readable storage medium, which is described below. In one embodiment, cache memory elements of memory 704 provide temporary storage of at least some program code (e.g., program code 714) in order to reduce the number of times code must be retrieved from bulk storage while instructions of the program code are executed. Moreover, similar to CPU 702, memory 704 may reside at a single physical location, including one or more types of data storage, or be distributed across a plurality of physical systems or a plurality of computer readable storage media in various forms. Further, memory 704 can include data distributed across, for example, a local area network (LAN) or a wide area network (WAN).

I/O interface 706 includes any system for exchanging information to or from an external source. I/O devices 710 include any known type of external device, including a display, keyboard, etc. Bus 708 provides a communication link between each of the components in computer 102, and may include any type of transmission link, including electrical, optical, wireless, etc.

I/O interface 706 also allows computer 102 to store information (e.g., data or program instructions such as program code 714) on and retrieve the information from computer data storage unit 712 or another computer data storage unit (not shown). Computer data storage unit 712 includes one or more known computer readable storage media, where a computer readable storage medium is described below. In one embodiment, computer data storage unit 712 is a non-volatile data storage device, such as, for example, a solid-state drive (SSD), a network-attached storage (NAS) array, a storage area network (SAN) array, a magnetic disk drive (i.e., hard disk drive), or an optical disc drive (e.g., a CD-ROM drive which receives a CD-ROM disk or a DVD drive which receives a DVD disc).

Memory 704 and/or storage unit 712 may store computer program code 714 that includes instructions that are executed by CPU 702 via memory 704 to define and use a dialog-style API in a machine learning solution. Although FIG. 7 depicts memory 704 as including program code, the present invention contemplates embodiments in which memory 704 does not include all of code 714 simultaneously, but instead at one time includes only a portion of code 714.

Further, memory 704 may include an operating system (not shown) and may include other systems not shown in FIG. 7.

In one embodiment, computer data storage unit 712 includes a data repository operatively coupled to dialog-style API system 104 (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to defining and using a dialog-style API in a machine learning solution. Thus, an embodiment of the present invention discloses a process for supporting computer infrastructure, where the process includes providing at least one support service for at least one of integrating, hosting, maintaining and deploying computer-readable code (e.g., program code 714) in a computer system (e.g., computer 102) including one or more processors (e.g., CPU 702), wherein the processor(s) carry out instructions contained in the code causing the computer system to define and use a dialog-style API in a machine learning solution. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of defining and using a dialog-style API in a machine learning solution.

While it is understood that program code 714 for defining and using a dialog-style API in a machine learning solution may be deployed by manually loading directly in client, server and proxy computers (not shown) via loading a computer-readable storage medium (e.g., computer data storage unit 712), program code 714 may also be automatically or semi-automatically deployed into computer 102 by sending program code 714 to a central server or a group of central servers. Program code 714 is then downloaded into client computers (e.g., computer 102) that will execute program code 714. Alternatively, program code 714 is sent directly to the client computer via e-mail. Program code 714 is then either detached to a directory on the client computer or loaded into a directory on the client computer by a button on the e-mail that executes a program that detaches program code 714 into a directory. Another alternative is to send program code 714 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 714 is transmitted to the proxy server and then it is stored on the proxy server.

Another embodiment of the invention provides a method that performs the process steps on a subscription, advertising and/or fee basis. That is, a service provider can offer to create, maintain, support, etc. a process of defining and using a dialog-style API in a machine learning solution. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 704 and computer data storage unit 712) having computer readable program instructions 714 thereon for causing a processor (e.g., CPU 702) to carry out aspects of the present invention.

The computer readable storage medium can be a tangible device that can retain and store instructions (e.g., program code 714) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 714) described herein can be downloaded to respective computing/processing devices (e.g., computer 102) from a computer readable storage medium or to an external computer or external storage device (e.g., computer data storage unit 712) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 714) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2, FIG. 3, FIG. 4, FIG. 5, and FIG. 6) and/or block diagrams (e.g., FIG. 1 and FIG. 7) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 714).

These computer readable program instructions may be provided to a processor (e.g., CPU 702) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 712) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 714) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
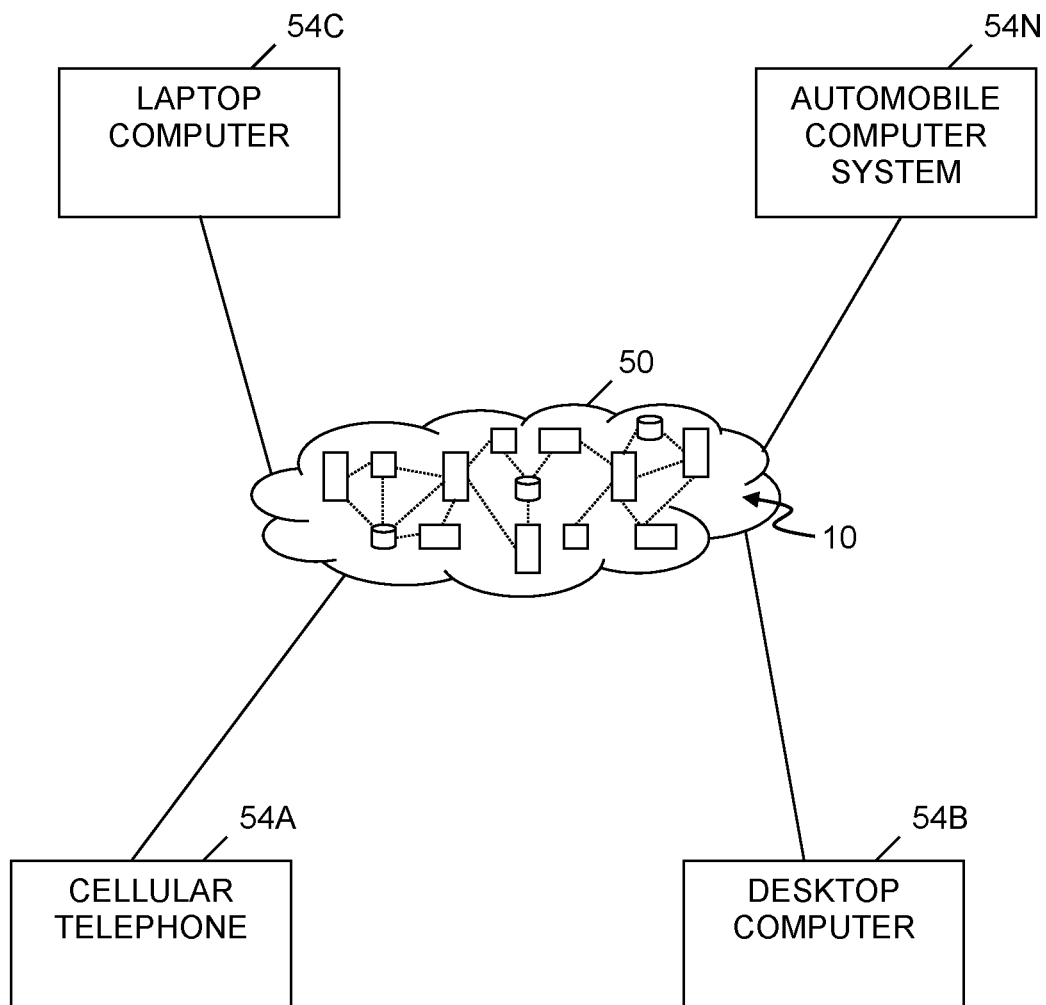
FIG. 8 depicts a cloud computing environment, in accordance with embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 8 are intended to be illustrative only and that computing nodes 10 and cloud computing environment 50 can communicate with any type of computerized device over any type of network and/or network addressable connection (e.g., using a web browser).

Figure 9:
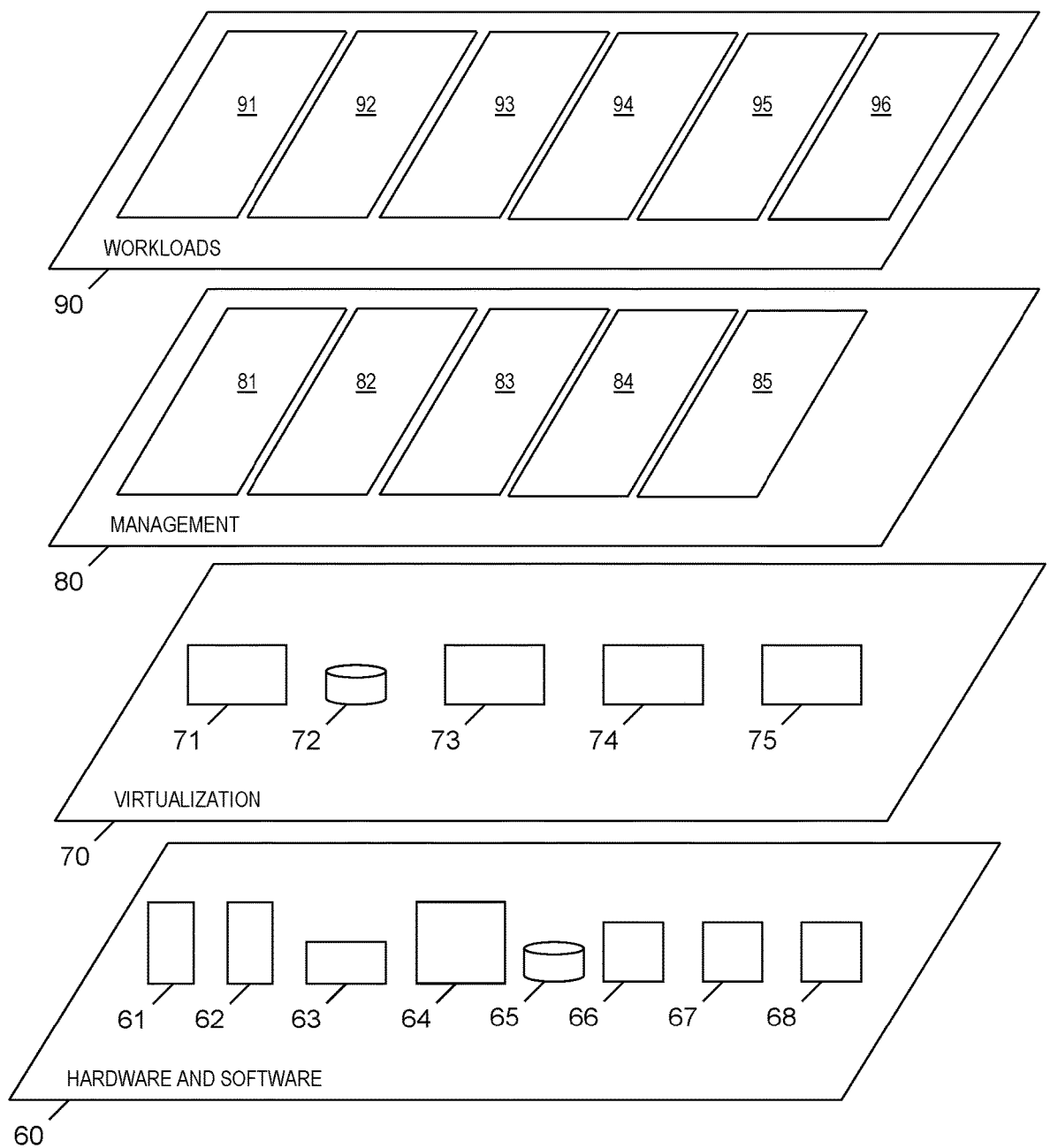
FIG. 9 depicts abstraction model layers, in accordance with embodiments of the present invention.

Referring now to FIG. 9, a set of functional abstraction layers provided by cloud computing environment 50 (see FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and usage of a dialog-style API in a machine learning solution 96.

What is claimed is:

1. A computer-implemented method comprising:

receiving, by one or more processors of a server computer and from a client computer, a first call to an application programming interface (API) in a machine learning solution as a first request for which a set of data items is required;

in response to the receiving the first call to the API, determining, by the one or more processors, that the first request includes none of the data items included in the set of data items required by the first request;

in response to the determining that the first request includes none of the data items included in the set of data items required for the first request, sending, by the one or more processors and to the client computer, first metadata that describes the data items included in the set of data items required for the first request;

receiving, by the one or more processors and from the client computer, a second call to the API as a second request that attempts to provide the set of data items required by the first request;

in response to the receiving the second call to the API, determining, by the one or more processors, that the second request is missing a data item included in the set of data items required by the first request or includes a data item that is required by the first request but is invalid;

in response to the determining that the second request is missing the data item included in the set of data items or includes the data item that is invalid, sending, by the one or more processors and to the client computer, a reply that includes a description of the data item that is missing in the second request or a description of a valid data item that is required by the first request and is a valid version of the data item that is invalid;

receiving, by the one or more processors and from the client computer, a third call to the API as a third request that includes the data item that is missing in the second request or includes the valid data item; and in response to the receiving the third call to the API, sending, by the one or more processors and to the client computer, a second reply having values of data items in a response to the third request and second metadata that describes the data items in the response to the third request.

2. The method of claim 1, further comprising:

receiving, by the one or more processors and from the client computer, a fourth call to the API as a fourth request for which a second set of data items is required;

in response to the receiving the fourth call to the API, determining, by the one or more processors, that the fourth request includes none of the data items included in the second set of data items required by the fourth request;

in response to the determining that the fourth request includes none of the data items included in the second set of data items required for the fourth request, sending, by the one or more processors and to the client computer, metadata that describes the data items included in the second set of data items required for the fourth request;

receiving, by the one or more processors and from the client computer, a fifth call to the API as a fifth request;

in response to the receiving the fifth call to the API, determining, by the one or more processors, that the fifth request includes the second set of data items;

in response to the determining that the fifth request includes the second set of data items, sending, by the one or more processors and to the client computer, a reply that includes a description of one or more additional data items that are not included in the second set of data items;

receiving, by the one or more processors and from the client computer, a sixth call to the API as a sixth request that includes the additional data items that are not included in the second set of data items; and in response to the receiving the sixth call to the API, sending, by the one or more processors and to the client computer, a third reply having second values of data items in a response to the sixth request and third metadata that describes the data items in the response to the sixth request.

3. The method of claim 1, further comprising:

implementing, by the one or more processors, an API platform for the API by developing code for the API platform, testing the API platform, and deploying the API platform;

subsequent to the implementing the API platform, implementing, by the one or more processors, a client platform for the client computer by developing code for the client platform, testing the client platform, and deploying the client platform; and subsequent to the implementing the client platform, defining, by the one or more processors, the API, testing, by the one or more processors, the API, and deploying, by the one or more processors, the API.

4. The method of claim 3, further comprising:

determining, by the one or more processors, that a change in the API is needed;

re-defining, by the one or more processors, the API which incorporates the change into the API;

re-testing, by the one or more processors, the API which has the change incorporated; and re-deploying, by the one or more processors, the API which has the change incorporated, wherein the re-defining, re-testing, and re-deploying of the API does not require a re-developing of the code for the API platform, a re-testing of the API platform, a re-deploying of the API platform, a re-developing of code for the client platform, a re-testing of the client platform, or a re-deploying of the client platform.

5. The method of claim 1, further comprising:

determining, by the one or more processors, that the set of data items is insufficient for the machine learning solution to generate an assessment, a recommendation, or an explanation based on a current situation;

in response to the determining that the set of data items is insufficient, sending, by the one or more processors and to the client computer, a request for additional data items by displaying a structured user interface to a user of the client computer, the structured user interface configured to request values for the additional data items;

receiving, by the one or more processors and from the client computer, a fourth call to the API as a fourth request having the additional data items;

based on the additional data items received in the fourth call to the API, determining, by the one or more processors, that other additional data items are required by the machine learning solution;

in response to the determining that the other additional data items are required, sending, by the one or more processors and to the client computer, a second request for the other additional data items; and receiving, by the one or more processors and from the client computer, a fifth call to the API as a fifth request having the other additional data items, wherein the sending the request for additional data items, receiving the fourth call, the sending the second request for the other additional data items, and the receiving the fifth call do not require a change to the client computer.

6. The method of claim 1, further comprising:

using the machine learning solution and based on the reply, generating, by the one or more processors, an assessment, a recommendation, and an explanation; and changing, by the one or more processors, a domain specific component of the machine learning solution, without requiring custom coding or a re-deployment of a platform of the client computer.

7. The method of claim 1, further comprising:

providing at least one support service for at least one of creating, integrating, hosting, maintaining, and deploying computer readable program code in a computer, the program code being executed by a processor of the computer to implement steps of receiving the first call to the API, determining that the first request includes none of the data items included in the set of data items required by the first request, sending the first metadata, receiving the second call to the API, determining that the second request is missing the data item included in the set of data items required by the first request or includes the data item that is required by the first request but is invalid, sending the reply, receiving the third call to the API, and sending the second reply.

8. A computer program product for using an application programming interface (API) in a machine learning solution, the computer program product comprising:

a computer readable storage medium having computer readable program code stored on the computer readable storage medium, the computer readable program code being executed by a central processing unit (CPU) of a server computer system to cause the server computer system to perform a method comprising:
- the server computer system receiving from a client computer system a first call to an application programming interface (API) in a machine learning solution as a first request for which a set of data items is required;
- in response to the receiving the first call to the API, the server computer system determining that the first request includes none of the data items included in the set of data items required by the first request;
- in response to the determining that the first request includes none of the data items included in the set of data items required for the first request, the server computer system sending to the client computer system first metadata that describes the data items included in the set of data items required for the first request;
- the server computer system receiving from the client computer system a second call to the API as a second request that attempts to provide the set of data items required by the first request;
- in response to the receiving the second call to the API, the server computer system determining that the second request is missing a data item included in the set of data items required by the first request or includes a data item that is required by the first request but is invalid;
- in response to the determining that the second request is missing the data item included in the set of data items or includes the data item that is invalid, the server computer system sending to the client computer system a reply that includes a description of the data item that is missing in the second request or a description of a valid data item that is required by the first request and is a valid version of the data item that is invalid;
- the server computer system receiving from the client computer system a third call to the API as a third request that includes the data item that is missing in the second request or includes the valid data item; and
- in response to the receiving the third call to the API, the server computer system sending to the client computer system a second reply having values of data items in a response to the third request and second metadata that describes the data items in the response to the third request.

9. The computer program product of claim 8, wherein the method further comprises:
- the server computer system receiving from the client computer system a fourth call to the API as a fourth request for which a second set of data items is required;
- in response to the receiving the fourth call to the API, the server computer system determining that the fourth request includes none of the data items included in the second set of data items required by the fourth request;
- in response to the determining that the fourth request includes none of the data items included in the second set of data items required for the fourth request, the server computer system sending to the client computer system metadata that describes the data items included in the second set of data items required for the fourth request;
- the server computer system receiving from the client computer system a fifth call to the API as a fifth request;
- in response to the receiving the fifth call to the API, the server computer system determining that the fifth request includes the second set of data items;
- in response to the determining that the fifth request includes the second set of data items, the server computer system sending to the client computer system a reply that includes a description of one or more additional data items that are not included in the second set of data items;
- the server computer system receiving from the client computer system a sixth call to the API as a sixth request that includes the additional data items that are not included in the second set of data items; and
- in response to the receiving the sixth call to the API, the server computer system sending to the client computer system a third reply having second values of data items in a response to the sixth request and third metadata that describes the data items in the response to the sixth request.

10. The computer program product of claim 8, wherein the method further comprises:
- the server computer system implementing an API platform for the API by developing code for the API platform, testing the API platform, and deploying the API platform;
- subsequent to the implementing the API platform, the server computer system implementing a client platform for the client computer system by developing code for the client platform, testing the client platform, and deploying the client platform; and
- subsequent to the implementing the client platform,
  - the server computer system defining the API,
  - the server computer system testing the API, and
  - the server computer system deploying the API.

11. The computer program product of claim 10, wherein the method further comprises:
- the server computer system determining that a change in the API is needed;
- the server computer system re-defining the API which incorporates the change into the API;
- the server computer system re-testing the API which has the change incorporated; and
- the server computer system re-deploying the API which has the change incorporated, wherein the re-defining, re-testing, and re-deploying of the API does not require a re-developing of the code for the API platform, a re-testing of the API platform, a re-deploying of the API platform, a re-developing of code for the client platform, a re-testing of the client platform, or a re-deploying of the client platform.

12. The computer program product of claim 8, wherein the method further comprises:
- the server computer system determining that the set of data items is insufficient for the machine learning solution to generate an assessment, a recommendation, or an explanation based on a current situation;
- in response to the determining that the set of data items is insufficient, the server computer system sending to the client computer system a request for additional data items by displaying a structured user interface to a user of the client computer system, the structured user interface configured to request values for the additional data items;

the server computer system receiving from the client computer system a fourth call to the API as a fourth request having the additional data items;

based on the additional data items received in the fourth call to the API, the server computer system determining that other additional data items are required by the machine learning solution;

in response to the determining that the other additional data items are required, the server computer system sending to the client computer system a second request for the other additional data items; and the server computer system receiving from the client computer system a fifth call to the API as a fifth request having the other additional data items, wherein the sending the request for additional data items, receiving the fourth call, the sending the second request for the other additional data items, and the receiving the fifth call do not require a change to the client computer system.

13. A server computer system comprising:

a central processing unit (CPU);

a memory coupled to the CPU; and one or more computer readable storage media coupled to the CPU, the one or more computer readable storage media collectively containing instructions that are executed by the CPU via the memory to implement a method of using an application programming interface (API) in a machine learning solution, the method comprising:

the server computer system receiving from a client computer system a first call to an application programming interface (API) in a machine learning solution as a first request for which a set of data items is required;

in response to the receiving the first call to the API, the server computer system determining that the first request includes none of the data items included in the set of data items required by the first request;

in response to the determining that the first request includes none of the data items included in the set of data items required for the first request, the server computer system sending to the client computer system first metadata that describes the data items included in the set of data items required for the first request;

the server computer system receiving from the client computer system a second call to the API as a second request that attempts to provide the set of data items required by the first request;

in response to the receiving the second call to the API, the server computer system determining that the second request is missing a data item included in the set of data items required by the first request or includes a data item that is required by the first request but is invalid;

in response to the determining that the second request is missing the data item included in the set of data items or includes the data item that is invalid, the server computer system sending to the client computer system a reply that includes a description of the data item that is missing in the second request or a description of a valid data item that is required by the first request and is a valid version of the data item that is invalid;

the server computer system receiving from the client computer system a third call to the API as a third request that includes the data item that is missing in the second request or includes the valid data item; and in response to the receiving the third call to the API, the server computer system sending to the client computer system a second reply having values of data items in a response to the third request and second metadata that describes the data items in the response to the third request.

14. The server computer system of claim 13, wherein the method further comprises:

the server computer system receiving from the client computer system a fourth call to the API as a fourth request for which a second set of data items is required;

in response to the receiving the fourth call to the API, the server computer system determining that the fourth request includes none of the data items included in the second set of data items required by the fourth request;

in response to the determining that the fourth request includes none of the data items included in the second set of data items required for the fourth request, the server computer system sending to the client computer system metadata that describes the data items included in the second set of data items required for the fourth request;

the server computer system receiving from the client computer system a fifth call to the API as a fifth request;

in response to the receiving the fifth call to the API, the server computer system determining that the fifth request includes the second set of data items;

in response to the determining that the fifth request includes the second set of data items, the server computer system sending to the client computer system a reply that includes a description of one or more additional data items that are not included in the second set of data items;

the server computer system receiving from the client computer system a sixth call to the API as a sixth request that includes the additional data items that are not included in the second set of data items; and in response to the receiving the sixth call to the API, the server computer system sending to the client computer system a third reply having second values of data items in a response to the sixth request and third metadata that describes the data items in the response to the sixth request.

15. The server computer system of claim 13, wherein the method further comprises:

the server computer system implementing an API platform for the API by developing code for the API platform, testing the API platform, and deploying the API platform;

subsequent to the implementing the API platform, the server computer system implementing a client platform for the client computer system by developing code for the client platform, testing the client platform, and deploying the client platform; and subsequent to the implementing the client platform,
the server computer system defining the API,
the server computer system testing the API, and
the server computer system deploying the API.

16. The server computer system of claim 15, wherein the method further comprises:

the server computer system determining that a change in the API is needed;

the server computer system re-defining the API which incorporates the change into the API;

the server computer system re-testing the API which has the change incorporated; and the server computer system re-deploying the API which has the change incorporated, wherein the re-defining, re-testing, and re-deploying of the API does not require a re-developing of the code for the API platform, a re-testing of the API platform, a re-deploying of the API platform, a re-developing of code for the client platform, a re-testing of the client platform, or a re-deploying of the client platform.

17. The server computer system of claim 13, wherein the method further comprises:

the server computer system determining that the set of data items is insufficient for the machine learning solution to generate an assessment, a recommendation, or an explanation based on a current situation;

in response to the determining that the set of data items is insufficient, the server computer system sending to the client computer system a request for additional data items by displaying a structured user interface to a user of the client computer system, the structured user interface configured to request values for the additional data items;

the server computer system receiving from the client computer system a fourth call to the API as a fourth request having the additional data items;

based on the additional data items received in the fourth call to the API, the server computer system determining that other additional data items are required by the machine learning solution;

in response to the determining that the other additional data items are required, the server computer system sending to the client computer system a second request for the other additional data items; and the server computer system receiving from the client computer system a fifth call to the API as a fifth request having the other additional data items, wherein the sending the request for additional data items, receiving the fourth call, the sending the second request for the other additional data items, and the receiving the fifth call do not require a change to the client computer system.

* * * * *